United States Patent [19]

Nishioka

[11] 4,016,426

[45] Apr. 5, 1977

[54] AIR CUSHION ACTUATION AND MALFUNCTION DETECTION AND RECORDING CIRCUIT

[75] Inventor: Tetsuji Nishioka, Yokohama, Japan

[73] Assignee: Nissan Motor Co., Ltd., Japan

[22] Filed: Nov. 21, 1975

[21] Appl. No.: 634,270

[30] Foreign Application Priority Data

Nov. 29, 1974 Japan ............................ 49-143358

[52] U.S. Cl. ............................ 307/10 R; 340/52 H;
180/103 A; 280/728; 307/121
[51] Int. Cl.² ........................................ B60R 21/08
[58] Field of Search ................. 307/10 R, 121, 119,
307/120; 340/262, 52 H, 52 R, 61; 180/105 E,
105 R, 103 A, 106, 91; 280/150 AB

[56] References Cited

UNITED STATES PATENTS

| | | | |
|---|---|---|---|
| 3,818,431 | 6/1974 | Hosaka | 307/10 R |
| 3,921,129 | 11/1975 | Sumida | 340/52 H |
| 3,949,357 | 4/1976 | Hosaka | 280/150 AB |

*Primary Examiner*—Herman Hohauser
*Attorney, Agent, or Firm*—Robert E. Burns; Emmanuel J. Lobato; Bruce L. Adams

[57] ABSTRACT

A control circuit for actuating an inflatable air cushion in a motor vehicle includes an electrically operated actuator comprising a plurality of squibs and a plurality of diodes having their anodes connected to one sides of the squibs, respectively. The actuator is connected between first and second normally open vehicle collision responsive switches. A first resistor is connected across the first switch while a second resistor connected across the second switch thereby to normally establish a potential at a first junction between the first switch and actuator, a potential at second junctions between the diodes and the squibs and a potential at a third junction between the actuator and the second switch. A malfunction detection circuitry is provided for monitoring the voltage at the first, second and third junctions and for energizing recorder means in the event of a malfunction in the control circuit resulting in the two voltages at the first and third junctions assuming substantially a relatively low value and substantially a relatively high value, respectively, or in the event of a malfunction in the control circuit resulting in the voltage at the first junction, the voltage at one or more of the second junction and the voltage at the third junction assuming substantially the relatively high value substantially the relatively low value and substantially the relatively low value, respectively.

5 Claims, 2 Drawing Figures

AIR CUSHION ACTUATION AND MALFUNCTION DETECTION AND RECORDING CIRCUIT

The present invention relates to control circuits for actuating a safety device located in a passenger conveyance for the purpose of protecting the passenger from injury in the event of a collision and more particularly to circuit means for continuously monitoring the control circuit to record a malfunction in the control circuit.

An air cushion located in a passenger conveyance for the purpose of protecting the passenger from injury in the event of a collision might cause a collision should its control circuit malfunction to inflate the air cushion during running of the passenger conveyance because the driver's view may be obstructed by the inflated air cushion. In practice, it would be very difficult to prevent the malfunction perfectly. It thus becomes necessary to determine whether the inflation of the air cushion occurs prior to or at the collision.

It is an object of the present invention to provide a control and malfunction detecting and recording circuit for an electrically actuable vehicle air cushion in order to fulfill the above-mentioned need.

A more clear understanding of the present invention may be had from the following detailed description which should be read in conjunction with the accompanying drawings, in which.

Figure 1:
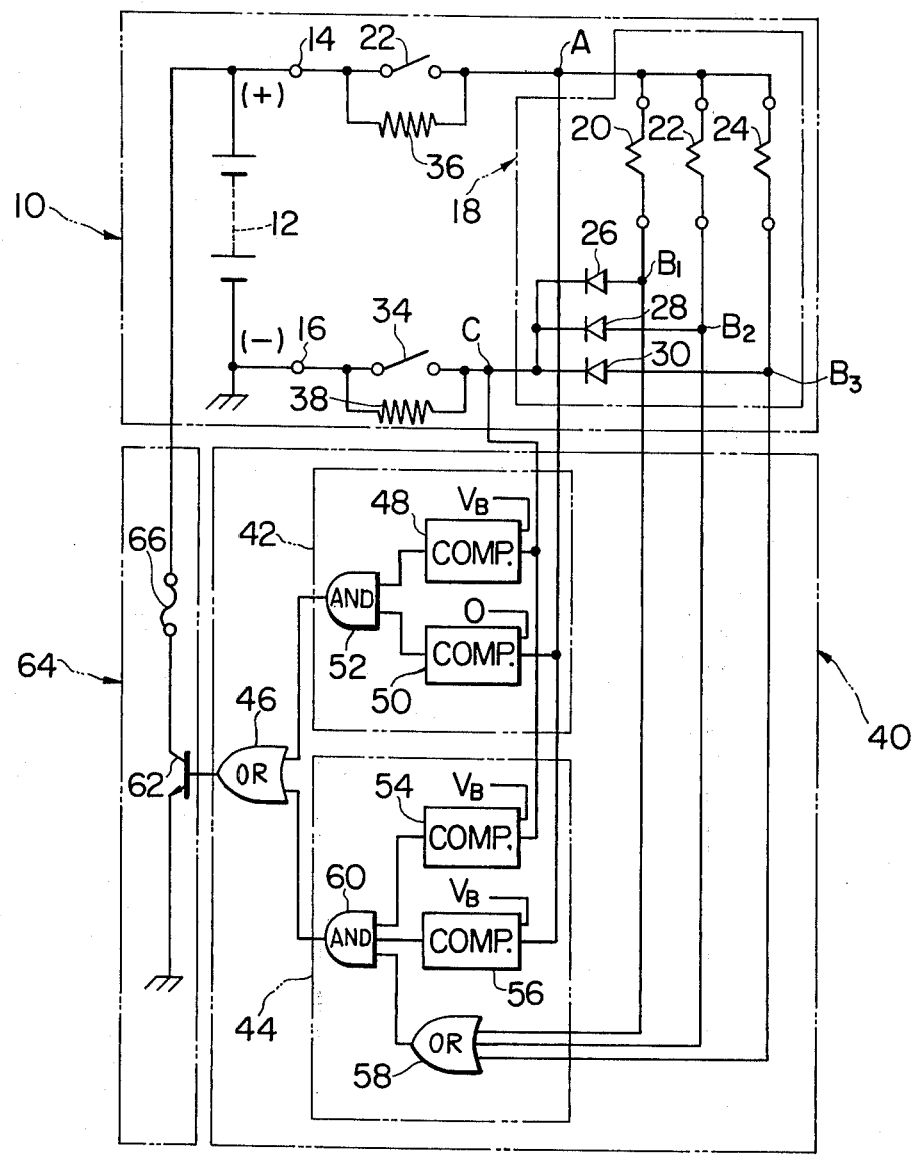
FIG. 1 shows a preferred embodiment of the present invention.

Referring to the accompanying drawings and particularly to FIG. 1 thereof a control circuit is indicated at 10 and a source of electrical power such as the vehicle battery 12 is shown to have a positive terminal 14 connected with a manually operated on/off switch such as the vehicle ignition switch (not shown) and a negative terminal 16 connected with a reference potential such as ground. An actuator 18 comprises three squibs 20, 22 and 24 and three diodes 26, 28 and 30 having their anodes connected to one sides of the squibs, respectively. The actuator means 18 is connected across the battery 12 through condition responsive switches 32 and 34. Two resistors 36 and 38 are connected across the switches 32 and 34, respectively to normally establish a voltage at a junction A between the actuator 18 and the switch 32, to establish a voltage at junctions $B_1$, $B_2$ and $B_3$ between the diodes 26, 28 and 30 and the squibs 20, 22 and 24, respectively, and to establish a voltage at a junction C between the actuator 18 and the switch 34.

The switches 32 and 34 are normally open switches which close when the vehicle is in acceleration or deceleration in excess of a predetermined magnitude and time duration such as would occur during a collision. The switches 32 and 34 are designed to close simultaneously in the event of a collision and upon closure of the switches 32 and 34 the squibs 20, 22 and 24 are connected directly across the battery 12 through the diodes 26, 28 and 30 which causes the squibs 20, 22 and 24 to be fired to actuate apparatus (not shown) for inflating an air cushion (not shown).

The control circuit 10 is so constructed and arranged that when the switches 32 and 34 are open, a small amount of current is permitted to flow through the squibs 20, 22 and 24 but the current is not large enough to fire the squibs 20, 22 and 24, that when both of the switches 32 and 34 are closed as would occur upon a vehicle collision a current more than a value of 100mA is permitted to flow through the squibs 20, 22 and 24 for a short period of time, firing all the squibs 20, 22 and 24 to cause the air cushion to be inflated, and that when one of the switches 32 and 34 is closed the squibs 20, 22 and 24 will not be fired because the current flowing through the squibs 20, 22 and 24 in this condition is not large enough to fire the squibs 20, 22 and 24. The values of resistance of the resistors 36 and 38 and the squibs 20, 22 and 24 are so selected that $R_{36}$ and $R_{38}$ are of the order of kilo ohms and $R_{20}$, $R_{22}$ and $R_{24}$ are of approximately 0.1 ohm. Therefore the monitoring junctions A, $B_1$, $B_2$, $B_3$ and C are normally at substantially the same potential and these potentials may be expressed as $$V_M = V_B \cdot R_{38}/(R_{36} + R_{38})$$

in which:

$V_M$ is the value of the potential at the monitoring junctions A, $B_1$, $B_2$, $B_3$ and C.
$V_B$ is the value of the battery 12 potential.
$R_{38}$ is the value of resistance of the resistor 38.
$R_{36}$ is the value of resistance of the resistor 36.

Let us now consider the variations of potential at the monitoring junctions A, $B_1$, $B_2$, $B_3$ and C:

Case I . . . Assuming the switches 32 and 34 are open and all the connections in the control circuit 10 are sound, this will not cause the energization of any one of the squibs 20, 22 and 24.

Case II . . . Assuming the switches 32 and 34 are closed and all the connections in the control circuit are sound, this will cause the energization of all of the squibs and consequent inflation of the air cushion.

Voltages at the monitoring junctions A, $B_1$, $B_2$, $B_3$ and C in the Case I and those in the Case II are respectively given in the following Table.

Table I

| | Junction A | Junction $B_1$ | Junction $B_2$ | Junction $B_3$ | Junction C |
|---|---|---|---|---|---|
| Case I | $V_M$ | $V_M$ | $V_M$ | $V_M$ | $V_M$ |
| Case II | $V_B$ | 0 | 0 | 0 | 0 |

Case III . . . Assuming the switches 32 and 34 are open and the positive side of one of the squibs 20, 22 and 24, taking the squib 20 as an example, and at the same time the negative side of the squib 20 contacts with the positive side of the battery 12, this will cause the energization of the squibs 20 and consequently partial inflation of the air cushion.

Case IV . . . Assuming the switches 32 and 34 are open and the positive side of one of the squibs 20, 22 and 24, taking the squib 20 as an example, and at the same time the negative side of the squib 20 contacts with ground, this will cause the energization of the squib 20 and consequent partial inflation of the air cushion.

Voltages at the monitoring junctions A, $B_1$, $B_2$, $B_3$ and C in the Case III and those in the Case IV are respectively given in the following Table.

Table II

|        | Junction A | Junction $B_1$ | Junction $B_2$ | Junction $B_3$ | Junction C |
|--------|------------|----------------|----------------|----------------|------------|
| Case III | 0 | $V_B$ | 0 | 0 | $V_B$ |
| Case IV  | $V_B$ | 0 | $V_B$ | $V_B$ | $V_B$ |

In order to distinguish between the former two Cases I and II (see Table I) and the latter two Cases III and IV (see Table II), a malfunction detection circuitry 40 has been deviced. The malfunction detection circuitry 40 monitors the voltage at the junctions A, $B_1$, $B_2$, $B_3$ and C and comprises a first detector unit 42, a second detector unit 44 and an OR gate 46. As shown diagramatically in FIG. 1, the detector unit 42 is designed to detect the Case III and includes two comparators 48 and 50, the inputs of which are connected with the monitoring junctions C and A, respectively, and an AND gate 52, whose inputs are connected with the outputs of the comparators 48 and 50. The comparator 48 provides a logical one signal to one of the inputs of the AND gate 52 when the voltage at the junction C rises from the value of $V_M$ to the value of $V_B$, while the comparator 50 provides a logical one signal to the other input of the AND gate 52 when the voltage at the junction A drops from the value of $V_M$ to the value of 0 (zero). The AND gate 52 provides a logical one signal to one input of the OR gate 46 when the voltages at the junctions C and A have the values of $V_B$ and 0 (zero), respectively, as in the Case III. The second detector unit 44 is designed to detect the Case IV and includes comparators 54 and 56, an OR gate 58 and an AND gate 60. The inputs of the comparators 54 and 56 are connected with the monitoring junctions C and A, respectively. Three inputs of the OR gate 58 are connected with the three monitoring junctions $B_1$, $B_2$ and $B_3$, respectively. Outputs of the comparators 54, 56 and the OR gate 58 are connected with three inputs of the AND gate 60. The comparator 54 provides a logical one signal to one input of the AND gate 60 when the voltage at the junction C rises from the value of $V_M$ to the value of $V_B$, while the comparator 56 provides a logical one signal to another input of the AND gate when the voltage at junction A rises from the value of $V_M$ to the value of $V_B$. The inputs to the OR gate consist of positive voltage, representing a logical one signal, and 0 voltage, representing a logical zero signal. The OR gate 58 provides a logical one signal when one of the voltages at the junctions $B_1$, $B_2$ and $B_3$ is positive. The AND gate 60 provides a logical one signal to the other input of the OR gate 46 when the voltage at the junction C is $V_B$, the voltage at the junction A is $V_B$ and at least one of the voltages at the junctions $B_1$, $B_2$ and $B_3$ is 0 (zero), as in the Case IV. It will be noted that since the OR gate 58 becomes disabled when all the voltages at the junctions $B_1$, $B_2$ and $B_3$ go 0 (zero), the Case II and Case IV can be distinguished from each other. It will now be understood that the signal on the output of the OR gate 46 is normally a logical zero but switches to a logical one in either the Case III or Case IV.

Reference numeral 64 designates a recorder which is energized by the malfunction detecting circuitry 40. The recorder 64 includes a fuse 66 having one end connected with the positive bus line such as the positive terminal of the vehicle battery 12 and the other end connected with the collector of an NPN transistor 62, the emitter of the NPN transistor 62 being grounded. The base of the NPN transistor 62 is connected with the output of the OR gate 46 in such a manner that the transistor 62 becomes conductive when logical one signal appears on the output of the OR gate 46. When the NPN transistor 62 becomes conductive, current flows through the fuse 66 blowing out the fuse 66. It will now be understood that the occurrence of the Case III or IV will cause the fuse 66 to be blown out, while the occurrence of the Case I or II will not.

Figure 2:
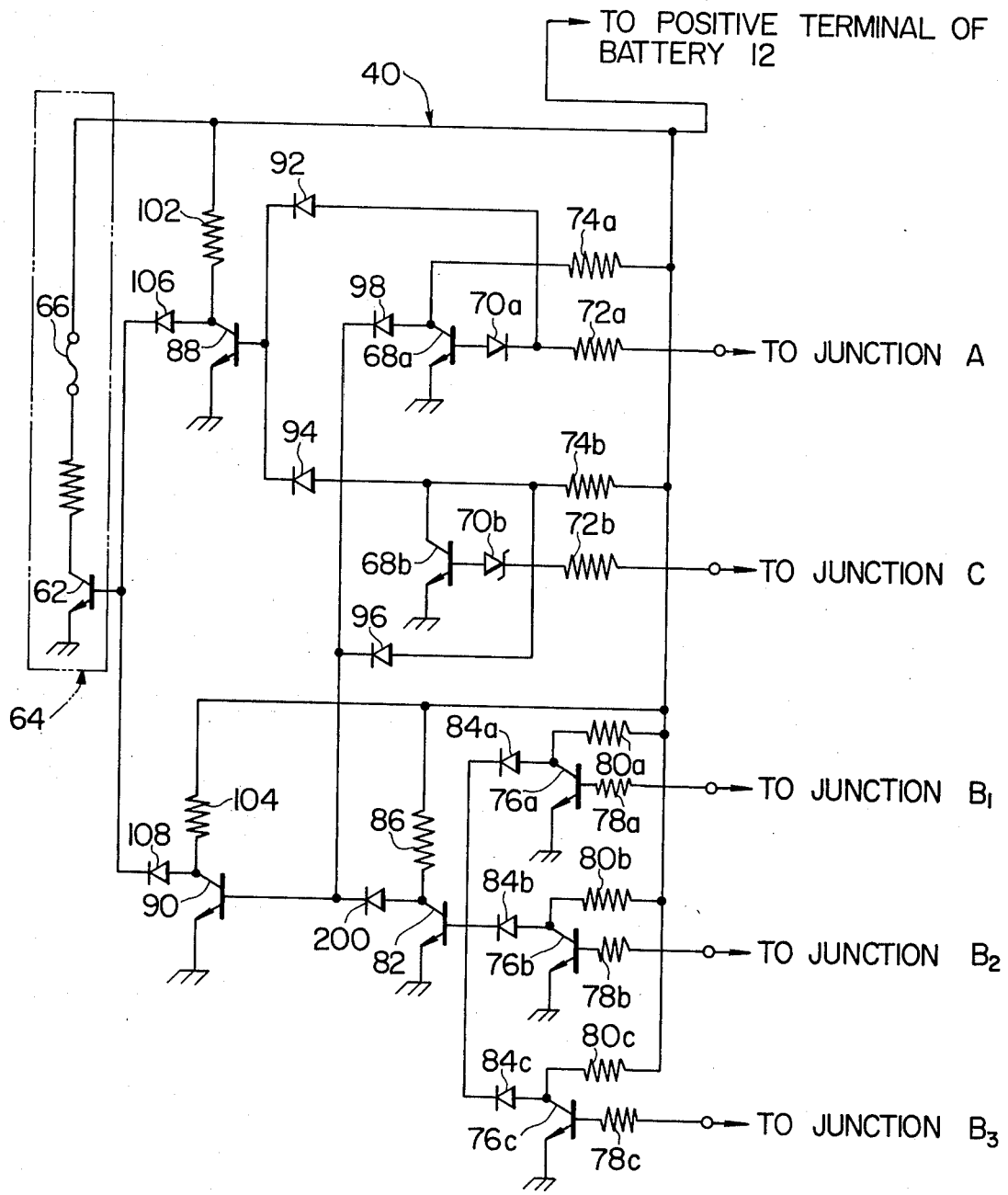
FIG. 2 shows a second preferred embodiment of the present invention in which a control circuit for actuating an air cushion is omitted for simplicity.

Referring to FIG. 2 the same reference numerals as those used in FIG. 1 are used to indicate like parts. FIG. 2 shows a circuit diagram of another malfunction detection circuitry 40.

As shown in FIG. 2, the malfunction detection circuitry 40 can be connected with the control circuit 10 (see FIG. 1) through input transistors 68a and 68b having their bases connected to the monitoring junctions A and C, respectively, through respective zenor diodes 70a and 70b and through respective resistors 72a and 72b. The collectors of the transistors 68a and 68b are commonly connected to the positive terminal of the battery 12 through respective resistors 74a and 74b while the emitters are connected to ground. The malfunction detection circuitry 40 includes also input transistors 76a, 76b and 76c having their bases connected to the monitoring junctions $B_1$, $B_2$ and $B_3$, respectively, through respective resistors 78a, 78b and 78c. The collectors of the transistors 76a, 76b and 76c are commonly connected to the positive terminal of the battery 12 through respective 80a, 80b and 80c while the emitters are connected to ground. The collectors of the transistors 76a, 76b and 76c are commonly connected or connected in parallel to the base of a transistor 82 through respective diodes 84a, 84b and 84c. The collector of the transistor 82 is connected to the positive terminal of the battery 12 through a resistor 86 while the emitter is connected to ground. The malfunction detection circuitry 40 also includes two output transistors 88 and 90. The base of the transistor 88 is connected to the monitoring junction A through a diode 92 and the resistor 72a and also to the collector of the input transistor 68b through a diode 94 while the base of the transistor 90 is connected to a junction between the collector of the transistor 68b and resistor 74b through a diode 96 and also connected to the collector of the transistor 68a through a diode 98. The base of the transistor 90 is also connected to the collector of the transistor 82 through a diode 100. The collectors of the transistors 88 and 90 are connected to the positive terminal of the battery 12 through respective resistors 102 and 104 while the emitters are connected to ground. The collectors of the transistors 88 and 90 are also connected to the base of the input transistor 62 of a recorder 64 through respective diodes 106 and 108.

The overall operation of the malfunction detection circuitry 40 described with reference to FIG. 2 is as follows: In the Case I (see Table 1) all the monitoring junctions are at substantially the same potential of $V_M$, the input transistors 68a and 68b are cut off due to the respective zenor diodes 70a and 70b while the input transistors 76a, 76b and 76c are conductive rendering the transistor 82 nonconductive. During this interval the transistors 88 and 90 are conductive rendering the input transistor 62 of the recorder 64 nonconductive. Thus no current is permitted to flow through the fuse 66. When the switches 32 and 34 are simultaneously (closed in the Case II, see Table I), the potential at the monitoring junction A increases to a potential of $V_B$ (battery 12 potential) and the potentials at the monitoring junctions $B_1$, $B_2$, $B_3$ and C drop to ground potential of 0 (zero). The rise of potential at the monitoring junction A renders the transistor 68a conductive while the drop of potentials at the junctions $B_1$, $B_2$ and $B_3$ render the transistors 76a, 76b and 76c nonconductive thus rendering the transistor 82 conductive. Therefore the transistor 90 is rendered nonconductive. The transistor 62 is held nonconductive due to the conduction of the transistor 82 even if the transistor 90 is cut off during this interval. Thus there is no flow of current through the fuse 66.

If the monitoring junctions A, $B_1$, $B_2$, $B_3$ and C are at potentials of 0 (zero, ground potential), $V_B$, 0, 0 and $V_B$, respectively as would occur when a malfunction of one of the two types previously described exists or subsequently develops in the control circuit 10 (the Case III, see Table II), the transistors 68a and 88 are rendered nonconductive thus rendering the transistor 62 conductive with the result that current is permitted to flow through the fuse 66 and the fuse 66 will be blown out. The other transistors 68b, 76a, 76b, 76c, 82 and 90 remain in the same state as they are when the control circuit 10 is in the proper condition with the switches 32 and 34 open. If the monitoring junctions A, $B_1$, $B_2$, $B_3$ and C are at potentials of $V_B$, 0 (zero, ground potential), $V_B$, $V_B$ and $V_B$, respectively as wound occur when a malfunction of the other one of the two types previously described exists or subsequently develops in the control circuit 10 (the Case IV, see Table II), the transistor 68a is rendered conductive, the transistor 76a is rendered nonconductive, the transistor 82 is rendered conductive and the transistor 90 is rendered nonconductive while the transistors 68b, 76b, 76c and 88 remain in the same state as they are when the control circuit 10 is in proper condition with the switches 32 and 34 open, with the result that current flow through the resistor 104, the diode 108, the base of the transistor 62 and the emitter thereof rendering the transistor 62 conductive. Thus the fuse 66 will be blown out and open the circuit.

Thus by checking the condition of the fuse 66 it may be determined, subsequent to a crash, whether a malfunction in the control circuit 10 of one of the type previously described existed at the time of crash. The condition of the fuse 66 permits a post-crash determination whether the inflatable air cushion was inflated prior to or at the time of the collision since if at least one of squibs 20, 22 and 24 is fired before both of the switches are closed the transistor 62 will be rendered conductive and the fuse 66 will be blown out.

What is claimed is:

1. In a passenger conveyance provided with a safety device, electrically operated actuator means for actuating the safety device, said actuator means comprising a plurality of squibs and a plurality of diodes having their anodes connected to one sides of the squibs, respectively;

a control circuit for operating said actuator means comprising first normally open condition responsive switch means connecting the other sides of the squibs to a source of direct current; second normally open condition responsive switch means connecting cathode sides of the diodes to a reference potential and first and second resistor means connected across said first and second switch means, respectively, to normally establish a first potential at a first junction between said first switch means and said actuator means, second potentials at second junctions between the diodes and the squibs, respectively, and a third potential at a third junction between said actuator means and said second switch means;

recorder means; and malfunction detecting means for energizing said recorder means when the voltage at the first junction assumes substantially a relatively low value and the voltage at the third junction substantially a relatively high value or when the voltage at the first junction assumes substantially the relatively high value, the voltage at least one of the second junctions substantially the relatively low value and the voltage at the third junction substantially the relatively high value.

2. In a passenger conveyance as claimed in claim 1, in which said malfunction detecting means comprises: first circuit means for providing a first signal at its output terminal when the voltage at the first junction assumes substantially the relatively low value and the voltage at the third junction substantially the relatively high value; second circuit means for providing a second signal at its output terminal when the voltage at the first junction assumed substantially the relatively high value, the voltage at least one of the second junctions substantially the relatively low value and the voltage at the third junction substantially the relatively high value; and gate means for energizing said recorder means when at least one of the first and second signal is present.

3. In a passenger conveyance as claimed in claim 2, in which said first circuit means comprises: an AND gate; first comparator means for providing a logical one signal to one of inputs of said AND gate when the voltage at the first junction assumes substantially the relatively low value; and second comparator means for providing a logical one signal to the other one of the inputs of said AND gate when the voltage at the third junction assumes substantially the relatively high value.

4. In a passenger conveyance as claimed in claim 2, in which said second circuit means comprises: an AND gate having first, second and third inputs; first comparator means for providing a logical one signal to the first input of said AND gate when the voltage at the first junction assumes substantially the relatively high value; second comparator means for providing a logical one signal to the second input of said AND gate when the voltage at the third junction assumes substantially the relatively high value; and an OR gate having its inputs connected to the second junctions, respectively and its output connected to the third input of said AND gate.

5. In a passenger conveyance as claimed in claim 1, in which said malfunction detecting means is constructed and arranged of a plurality of transistors.

* * * * *